Jan. 1, 1935.    T. J. ALDRIDGE    1,986,460
FLUID PRESSURE BRAKE
Filed May 27, 1931
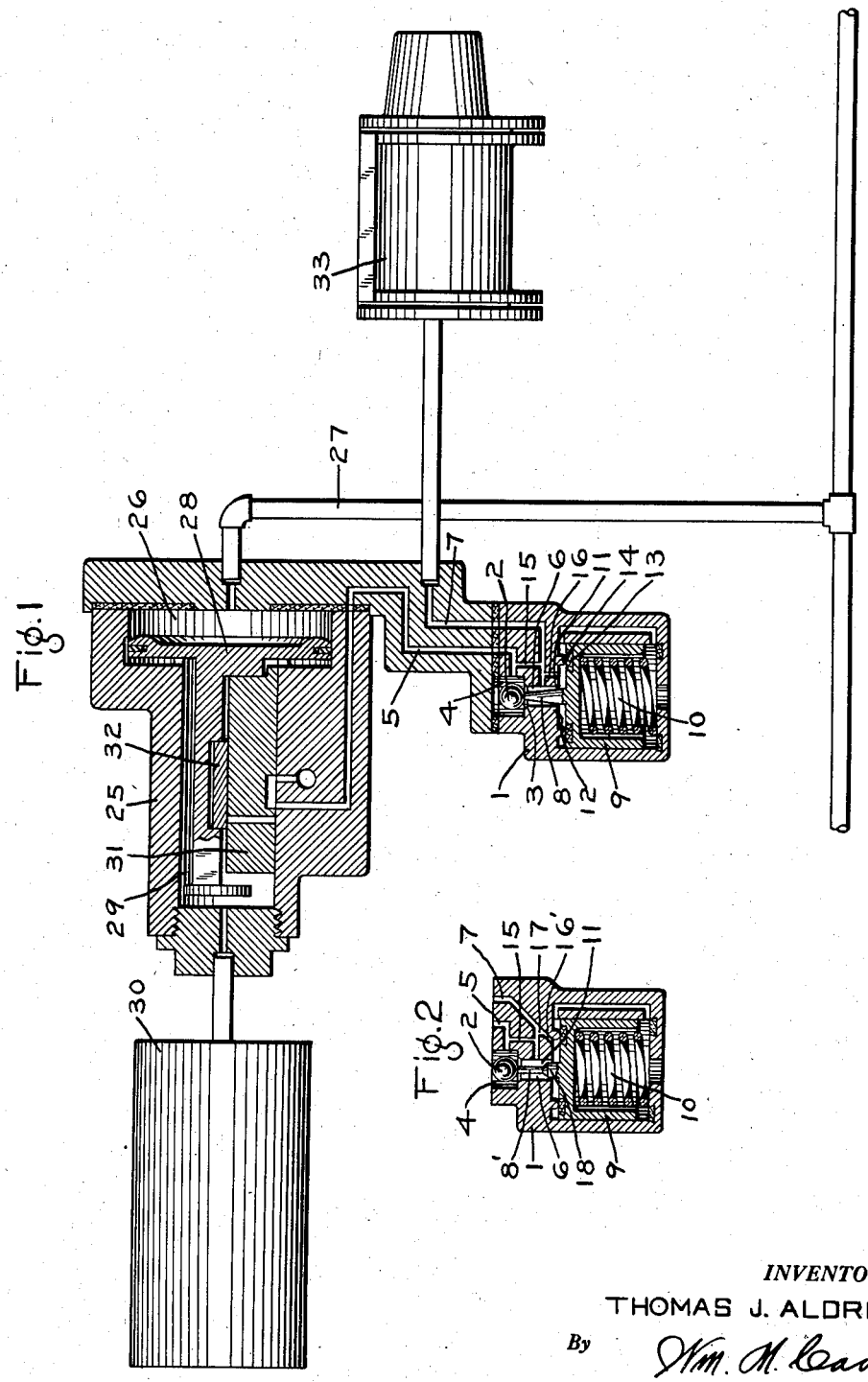
INVENTOR.
THOMAS J. ALDRIDGE
By  *Wm. M. Cady*
ATTORNEY.

Patented Jan. 1, 1935

1,986,460

UNITED STATES PATENT OFFICE 1,986,460

FLUID PRESSURE BRAKE

Thomas J. Aldridge, Turin, Italy, assignor to The Westinghouse Air Brake Company, Wilmerding, Pa., a corporation of Pennsylvania Application May 27, 1931, Serial No. 540,246
In Great Britain July 22, 1930

1 Claim. (Cl. 303—84)

This invention relates to valves adapted to be actuated by fluid under pressure for the purpose of controlling the supply of fluid in accordance with the pressure conditions obtaining in the space or receptacle supplied with fluid through the valve and has for its object to provide an improved controlling valve of this character.

The invention may be applied to valve devices actuated by fluid under pressure for various purposes and is particularly applicable to the so-called "quick-inshot" valves employed in connection with the triple or distributing valves of fluid pressure braking apparatus in which the supply of fluid to the brake cylinder of the apparatus in effecting an application of the brakes is arranged to occur in two distinct stages determined by the action of the quick-inshot valve. This valve is interposed in the path of the fluid flowing from the service port of the triple valve slide valve to the passage leading to the brake cylinder, the valve being normally open and being arranged to be closed as soon as a predetermined pressure is obtained in the brake cylinder, the closing of the valve under these conditions being effected or permitted by the action of the brake cylinder pressure acting upon an abutment in opposition to a spring or its equivalent normally tending to maintain the valve open. After the valve has been closed in this manner, the further supply of fluid under pressure to the brake cylinder is arranged to occur in a more restricted manner through a by-pass of predetermined suitable capacity.

In valves of this character as usually constructed, it is found that in some cases the flow of air through the valve before its closure is liable to exert a pressure on the abutment above referred to, which is, owing to the rate of flow of the air, greater than that corresponding to the actual pressure obtaining in the brake cylinder for the time being, with the result that the valve tends to close prematurely and having thus closed, the fluid pressure acting on the abutment is reduced to some extent, owing to the reduction in the rate of flow, with the result that the valve tends to reopen. The effect of this action is thus to prevent the closing movement of the valve from occurring in the desired positive, definite and final manner when the predetermined brake cylinder pressure is obtained.

According to the present invention this disadvantage is obviated by providing arrangements for protecting the abutment from fluid pressure due to the flow of fluid through the open valve or adjacent thereto or by causing the flow of the fluid to effect an actual reduction in the effective pressure exerted upon the abutment tending to close or to permit the closing of the valve. The movement of the abutment for this purpose will thus only occur under the action of the static fluid pressure obtaining in the receptacle and is thus rendered independent of sudden variations in pressure.

In the accompanying drawing; Fig. 1 is a view of a fluid pressure car brake equipment, showing the triple valve device in section, with my improvement embodied therein; and Fig. 2 a sectional view of an inshot valve device with a slightly modified form of my invention applied thereto.

The brake equipment shown in Fig. 1 comprises a triple valve device 25 having a piston chamber 26 connected to the usual brake pipe 27 and containing piston 28 and having a valve chamber 29, connected to the usual auxiliary reservoir 30 and containing a main slide valve 31 and a graduating slide valve 32 adapted to be operated by piston 28.

Associated with the triple valve device 25 is an inshot valve device comprising a casing 1 containing a ball valve 2 adapted in its closed position to engage with a suitable valve seat 3, a chamber 4 above which leads through a passage 5 to the service port of the distributing or triple valve device 25. A small chamber 6 formed underneath the valve seat 3 leads to a suitable passage 7 communicating with the brake cylinder 33 and the ball valve 2 is arranged normally to be held away from its seat 3 so as to provide relatively unrestricted communication between the chamber 4 and the chamber 6 by means of a stem 8 projecting vertically upwards from a piston 9 adapted to move in a vertical cylinder provided in the lower part of the casing 1. The piston 9 is normally maintained in its uppermost position shown in the drawing by means of a spring 10 acting on the under side of the piston 9, the stem 8 projecting through a suitable aperture 11 in the base 12 of the lower chamber 6, so as to engage with the ball valve 2 and hold the latter away from its seat 3. The upper face of the piston 9 is provided with an annular gasket 13 adapted to engage with a corresponding annular rib 14 formed in the upper end of the cylinder, so that when the piston 9 is in its uppermost position, that portion only of the upper face of the piston 9 lying within the annular rib 14 is subject to the pressure in the lower chamber 6 and consequently to the brake cylinder pressure. The chamber 4 above the valve seat 3 and the lower chamber 6 are arranged to communicate with one another through a restricted port or aperture 15, forming a by-pass to the valve, and it will be understood that when fluid is first supplied through the service port of the distributing valve and passage 5 to the chamber 4, this fluid flows freely past the ball valve 2 to the lower chamber 6 and thence to the brake cylinder 33 through the passage 7. When a predetermined pressure is obtained in the brake cylinder, this pressure acting upon the central portion of the upper face of the piston 9 inside the rib 14 causes the piston to move downwards and to permit the ball valve 2 to move downwards on to its seat 3, the subsequent supply of fluid to the brake cylinder occurring through the restricted by-pass port 15. Owing to the provision of the annular rib 14, the initial downward movement of the piston 9 causes the full area of its upper face to be subject to the pressure in the lower chamber 6, thus promoting a rapid continuation of the downward movement of the piston 9.

As ordinarily constructed, the necessary communication between the upper face of the piston 9 and the lower chamber 6 so as to enable the brake cylinder pressure to act upon the piston in the manner above explained, is effected by the clearance between the stem 8 of the piston and the aperture in the base 12 of the lower chamber 6 through which the stem 8 passes. It is found in practice, however, that the fluid flowing past the open ball valve is liable to exert, due to its rate of flow, a pressure upon the upper face of the piston 9 which is in excess of that due to the actual static conditions in the lower chamber 6 and in the brake cylinder, and in the construction shown in Figure 1, this undesirable action is prevented by causing the stem 8 of the piston 9 when the latter is in its upper position to fit within the aperture 11 leading from the lower chamber 6 to the upper face of the piston 9 with the minimum clearance necessary for effective operation.

In other words, the stem 8 is arranged to cut off as completely as possible direct communication between the lower chamber 6 and the upper face of the piston 9, this communication being on the other hand established through a port or orifice 16 which is as remote as possible from the direct path of flow of air past the ball valve 2.

In the construction shown in Figure 2 the port or orifice 16' establishing communication between the lower chamber 6 and the upper face of the piston 9 is inclined from the vertical so as to be nearly parallel to the general direction of the flow of fluid in the passage 7 leading to the brake cylinder, the opening or mouth 17 of this passage leading into the lower chamber 6 or into the brake cylinder passage 7, being so formed that the flow of air to the brake cylinder will cause by ejector action a positive reduction in the pressure exerted upon the upper face of the piston 9 so long as unrestricted flow of air to the brake cylinder continues. By this arrangement the pressure exerted upon the upper face of the piston 9 may be rendered somewhat less than that due to the static pressure of the fluid flowing to the brake cylinder and the opening movement of the piston 9 will consequently be delayed until the rate of flow of fluid has been reduced to an extent sufficient to permit the development of a static fluid pressure on the upper face of the piston sufficient to overcome the action of the controlling spring 10.

As shown in Figure 2, the lower part 18 of the stem 8' only may be arranged to fit closely into the aperture 11 leading from the lower chamber 6 to the space above the piston 9, the remaining portion of the stem 8 being of such dimensions as to permit relatively free communication between the lower chamber 6 and the piston 9.

In another construction the piston stem 8 may, as shown in Figure 1, be of such form as to permit a gradually increasing clearance or freedom of communication between the lower chamber 6 and the upper face of piston 9 as the latter moves downwards.

The increase in the freedom of communication between the chamber 6 and the space above the upper surface of the piston 9 which occurs in both constructions but more particularly in the construction of Figure 2 as above explained when the piston 9 commences to move downwards, possesses the important advantage of preventing any momentary lag or halt in the movement of the piston 9 due to the sudden expansion of the fluid within the annular rib 14 when the gasket 13 moves out of engagement therewith. The temporary reduction in pressure on the piston due to this expansion is thus compensated for by the relatively free flow of fluid from the chamber 6 as soon as the piston begins to move and this movement is thus rendered positive and continuous.

The invention is evidently not limited in its application to fluid pressure braking apparatus but may be employed in connection with pressure actuated valves for other purposes in which a positive and definite action of the valve is required when a predetermined fluid pressure is obtained in the space or receptacle supplied with fluid from the valve.

Furthermore, the invention is not limited as applied to fluid pressure braking apparatus to any of the particular constructions above described and illustrated by way of example.

Having now particularly described and ascertained the nature of the said invention and in what manner the same is to be performed, I declare that what I claim is:

In a fluid pressure brake, the combination with a brake cylinder, of a valve device for regulating the rate of flow of fluid under pressure to the brake cylinder, comprising a valve for controlling the flow of fluid to the brake cylinder, a movable abutment normally maintaining said valve in open position and operated upon a predetermined increase in the pressure of fluid flowing to the brake cylinder pressure to permit said valve to seat, said valve device having a restricted port for supplying fluid to said abutment, and means operated by the flow of fluid to the brake cylinder for reducing the pressure of fluid on said abutment.

THOMAS J. ALDRIDGE.